United States Patent [19]
Chang

[11] 4,355,071
[45] * Oct. 19, 1982

[54] CLEAR COAT/COLOR COAT FINISH CONTAINING ULTRAVIOLET LIGHT STABILIZER

[75] Inventor: David C. Chang, Troy, Mich.

[73] Assignee: E. I. DuPont de Nemours and Company, Wilmington, Del.

[ * ] Notice: The portion of the term of this patent subsequent to Jun. 17, 1997, has been disclaimed.

[21] Appl. No.: 146,261

[22] Filed: May 5, 1980

Related U.S. Application Data

[63] Continuation of Ser. No. 60,255, Jul. 26, 1979, abandoned, which is a continuation-in-part of Ser. No. 902,416, May 3, 1978, Pat. No. 4,208,465.

[51] Int. Cl.[3] ......................... B32B 15/08; B44D 1/14

[52] U.S. Cl. .................................... 428/334; 427/386; 427/388.2; 427/388.3; 427/388.5; 427/393.5; 427/409; 427/410; 427/412.1; 428/414; 428/416; 428/423.7; 428/424.4; 428/425.1; 428/425.3; 428/458; 428/460; 428/463; 428/464; 428/480; 525/228; 525/293

[58] Field of Search ................ 260/45.95 F, 45.8 NT, 260/45.85 B, 45.95 B; 427/385.5, 388.4, 393.5, 409, 410, 412.1, 386, 388.2, 388.3, 388.5; 428/334, 416, 425.1, 425.3, 460, 461, 414, 423.7, 424.4, 458, 463, 480; 525/228, 293

[56] References Cited

U.S. PATENT DOCUMENTS

| | | | |
|---|---|---|---|
| 2,919,259 | 12/1959 | Naylor et al. . | |
| 2,976,259 | 3/1961 | Hardy et al. . | |
| 3,113,880 | 12/1963 | Hoeschele et al. . | |
| 3,134,752 | 5/1964 | Costello et al. . | |
| 3,407,156 | 10/1968 | LaBerge . | |
| 3,499,781 | 3/1970 | Krueckel . | |
| 3,639,147 | 2/1972 | Benefiel et al. . | |
| 3,660,537 | 5/1972 | Fryd et al. . | |
| 3,823,205 | 7/1974 | Zimmt . | |
| 3,984,500 | 10/1976 | Dickie et al. . | |
| 4,208,465 | 6/1980 | Chang | 427/409 X |

FOREIGN PATENT DOCUMENTS 53-134840 11/1978 Japan .

*Primary Examiner*—Michael R. Lusignan
*Attorney, Agent, or Firm*—Hilmar L. Fricke

[57] ABSTRACT

The weatherability and durability of clear coat/color coat finishes can be significantly increased by incorporating one or more ultraviolet light stabilizers into the color coat.

71 Claims, No Drawings

CLEAR COAT/COLOR COAT FINISH CONTAINING ULTRAVIOLET LIGHT STABILIZER

CROSS REFERENCE TO RELATED APPLICATIONS

This application is a continuation of Ser. No. 060,255, filed July 26, 1979, now abandoned, which is a continuation-in-part of Ser. No. 902,416, filed May 3, 1978, now U.S. Pat. No. 4,208,465, patented June 17, 1980.

BACKGROUND OF THE INVENTION

1. Field of the Invention

This invention is directed toward coated substrates, and in particular toward coated metal substrates that form the exterior of automobiles and trucks, which are characterized by excellent weatherability and durability, resulting from the incorporation of ultraviolet light stabilizer into the color coat of the substrates' clear coat/color coat finishes.

2. Description of the Prior Art

Acrylic enamel, acrylic lacquer and alkyd enamel finishes are widely used on the exterior of automobiles and trucks. It has been found that an excellent appearance along with depth of color and metallic glamour can be obtained by applying a clear or transparent coat over the conventional colored or pigmented coat. However, the weatherability and durability of these clear coats have been found to be poor. Checking, cracking and flaking of the clear coat occur after relatively short periods of exposure to outdoor weathering, giving the automobile or truck an unsightly appearance. Refinishing of these weathered clear coats is difficult and expensive since the clear coat must be sanded to remove cracked and flaked clear coat before a refinish coat can be applied.

In an effort to retard or substantially reduce checking, cracking and flaking of the clear coat, conventional ultraviolet light stabilizers with and without antioxidants have been added to the clear coat. The addition of ultraviolet light stabilizers to the clear coat will increase the life of the clear coat, but catastrophic failure will nevertheless occur once the concentration of stabilizer has been diminished due to weathering.

The concentration of ultraviolet light stabilizer in the clear coat can be increased to provide longer-lasting protection. Even so, the rate of volatilization of ultraviolet light stabilizers is such that catastrophic failure will still antedate the end of the vehicle's useful life. In addition, since ultraviolet light stabilizers are to some extent colored, an excess of stabilizer in the clear coat will create an unacceptable tint. Excessive quantities of stabilizer may also cause crazing and frosting of the clear coat.

There exists a felt need for a clear coat/color coat finish for metal substrates that will withstand long periods of weathering without failure of the finish. This invention provides a clear coat/color coat finish having excellent weatherability and durability, as required for automobiles and trucks.

SUMMARY OF THE INVENTION

There is provided by the present invention a substrate having a finish of a clear coat top layer in firm adherence to a color coat layer that is in adherence with the substrate, wherein (A) the clear coat consists essentially of a transparent film-forming binder;

(B) the color coat consists essentially of (1) a film-forming binder, (2) pigment, in a pigment-to-binder weight ratio of about 1/100 to 150/100, (3) ultraviolet light stabilizer, in an amount of about 1–20% by weight based on the weight of the binder, wherein the ultraviolet light stabilizer migrates from the color coat to the clear coat and continues to do so as ultraviolet light stabilizer is lost from the clear coat due to exposure to weathering, thereby providing an adequate level of ultraviolet light stabilizer to retard deterioration of the finish; and (C) the resultant finish has an excellent appearance and superior weathering properties and is particularly useful for finishing automobiles and trucks.

DETAILED DESCRIPTION OF THE INVENTION

The clear coat/color coat finish of this invention, wherein ultraviolet light stabilizer is added to the coating composition forming the color coat, achieves an excellence of weatherability which has heretofore not been achieved in clear coat/color coat finishes. Conventional clear coat/color coat systems which have been stabilized against ultraviolet radiation weather well for a short period of time but then rapidly degrade due to the volatilization and loss of the ultraviolet light stabilizer from the clear coat. In the present invention, ultraviolet light stabilizer migrates from the color coat to the clear coat in response to the loss of stabilizer from the clear coat, thereby providing an adequate level of ultraviolet light stabilizer in the clear coat to retard deterioration of the finish.

Optionally, the clear coat may also contain ultraviolet light stabilizer. Since the ultraviolet light stabilizer will migrate from the area of higher stabilizer concentration, i.e., from the color coat, to an area of lower concentration, it is not required that the clear coat contain stabilizer. Optionally, antioxidant may be incorporated into the color coat or the clear coat or both.

The color coat contains about 1–20% by weight, based on the weight of the film-forming binder, of ultraviolet light stabilizer. Preferably, about 5–8% by weight of ultraviolet light stabilizer is used. Either one specific ultraviolet light stabilizer or a combination of two or more stabilizers in amounts totalling the specified percentages may be utilized. Optionally, about 0.1–5%, and preferably about 0.1–1%, by weight of antioxidant may be used in the color coat; if so, the ratio of ultraviolet light stabilizer to antioxidant is about 1:1 to about 50:1. Optionally, ultraviolet light stabilizer or antioxidant may be used in the clear coat, in the same percentages as in the color coat.

The thickness of the fully cured color coat and clear coat can vary. Generally, the color coat is about 0.4–1.5 mils, preferably 0.6–1.0 mils, thick and the clear coat is about 0.5–6.0 mils, preferably 0.8–1.5 mils, thick.

The color coat contains pigment in a pigment-to-binder weight ratio of about 1/100 to about 150/100. Any of the conventional pigments used in coating compositions, including metallic flake pigments, can be used.

The clear coat can also contain transparent pigments, i.e., pigments having the same or a similar reference index as the binder of the clear coat which are of small particle size, about 0.015–50 microns. Typical pigments that can be used in a pigment-to-binder weight ratio of about 1/100 to 10/100 include inorganic siliceous pigments such as silica pigments. These pigments have a refractive index of about 1.4–1.6.

The coatings can be applied to all types of substrates, for instance, primed or unprimed metal, plastic, rubber, flexible ethylene-proplyene copolymer rubbers, flexible polyurethanes, fiberglass reinforced with polyester resins, and the like. Conventional spraying techniques are used. Preferably, the clear coat is applied to the color coat while the color coat is still wet. Other conventional application techniques, such as brushing, roller coating, electrostatic spraying, and the like can be used. Under some circumstances, it may be desirable to apply both the color coat and clear coat in the form of a powder and upon baking coalesce the powders into a clear coat/color coat finish. Also, it may be desirable to apply the clear coat as a powder to a wet color coat and then form a finish by baking.

Typical ultraviolet light stabilizers that are useful in this invention are as follows:

Benzophenones such as hydroxydodecycloxybenzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri- pentaerythritol, phenyl- and naphthlene-substituted oxalic acid diamides, methyl-$\beta$-(3,5-di-t-butyl-4-hydroxyphenyl)propionate, $\alpha,\alpha'$-bis(2-hydroxyphenyl)-diisopropylbenzene, 3,5'-dibromo-2'-hydroxyacetophenone, ester derivatives of 4,4-bis(4'-hydroxyphenyl)pentanoic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl) resorcinol, bis(3-hydroxy-4-benzoylphenoxy)diphenylsilane, bis(3-hydroxy-4-benzoylphenoxy)dialkylsilane, 1,8-naphthalimides, $\alpha$-cyano-$\beta,\beta$-diphenylacrylic acid derivatives, bis(2-benzoxazolyl)alkanes, bis(2-napthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl- or alkyl-substituted acrylonitriles, 3-methyl-5-isopropylphenyl-6-hydroxycoumarone.

Particularly useful ultraviolet light stabilizers that can be used are hindered amines of bipiperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate (5)]-Ni, bis[-phenyldithiocarbamato]-Ni(II), and others listed in the above patent, column 8, line 44 through line 55.

Typical antioxidants are as follows: tetrakisalkylene dialkylhydroxyaryl alkyl esters alkanes such as tetrakismethylene-3-(3',5'-dibutyl-4'-hydroxyphenyl) propionate methane, the reaction product of p-aminodiphenylamine and glycidyl methacrylate, the reaction product of n-hexyl-N'-phenyl-p-phenylene diamine and glycidyl methacrylate, pentaerythritol tetrakis(thioglycolate), trimethylolpropane tris(thioglycolate), trimethylolethane tris(thioglycolate), N-(4-anilinophenyl)acrylamide, N-(4-anilinophenol)maleamic acid, N-(4-anilinophenyl)maleimide, alkylhydroxyphenyl groups bonded through carboalkoxy linkages to the nitrogen atom of a heterocyclic nucleus containing an imidocarbonyl group or an imidodithiocarbonyl group, 3,5-di-t-butyl-4-hydroxycinnamonitrile, ethyl-3,5-di-t-hexyl-4-hydroxycinnamate, substituted benzyl esters of $\beta$-substituted hydroxyphenylpropionic acids, bis(hydroxyphenylalkylene) alkyl isocyanurate compounds, tetrakishydroxybenzylphosphonium halides alone or in combination with a dialkylthiodialkanoate, thiodimethylidyne tetrakisphenols alone or in combination with a dialkyl thiodialkanoate or phosphite or phosphonate, dihydrocarbylhydroxyphenylaryl or -alkyl phosphonites or phosphonates or phosphates or phosphites or phosphinates or phosphinites or phosphorothionates or phosphinothionates, diphenylbis(3,5-di-t-butyl-4-hydroxyphenoxy)silane, hydrocarbylhydroxyphenyldihydrocarbyldithiocarbamates such as 3,5-di-t-butyl-4-hydroxyphenyldimethyldithiocarbamate and aminobenzylthioester.

The film-forming binder used in the clear coat/color coat can be from those conventional coating compositions used to finish automobiles and trucks. For instance, solvent- or water-based acrylic lacquers, acrylic dispersion lacquers, solvent- or water-based thermosetting acrylic enamels, polyester enamels, nonaqueous acrylic dispersion enamels, alkyd resin enamels, polyurethane enamels, and acrylic or polyester powder coatings can be used. It is possible to have the binder of the clear coat different from the binder of the color coat, e.g., a thermosetting acrylic enamel clear coat can be used with a polyester enamel color coat.

Typical acrylic lacquers that can be used are disclosed in Crissey and Lowell U.S. Pat. Nos. 2,934,509 and 2,934,510, both issued on Apr. 26, 1960, Godshalk U.S. Pat. No. 2,860,110, issued Nov. 11, 1958, and Zimmt U.S. Pat. No. 3,823,205, issued July 9, 1974. The teachings of the Zimmt patent are hereby incorporated by reference.

One preferred acrylic lacquer is a solution in which the film-forming component is at least one of (1) poly(methyl methacrylate), (2) poly(ethyl methacrylate), (3) poly(propyl methacrylate), (4) poly(isopropyl methacrylate), (5) a copolymer composed only of methyl methacrylate and at least one of an alkyl acrylate whose alkyl group contains 1 through 20 carbon atoms, an alkyl methacrylate whose alkyl group contains 2 through 18 carbon atoms, or styrene, (6) mixtures of these, and at least one of (1) a copolymer composed only of methyl methacrylate and an alkyl acrylate whose alkyl group contains 1 through 10 carbon atoms or an alkyl methacrylate whose alkyl group contains 4 through 18 carbon atoms, or (2) mixtures of said copolymers; and the solution contains an inert organic solvent for the above polymers.

In another acrylic lacquer, particularly preferred, the film-forming component consists of poly(methyl methacrylate) and at least one of (1) a methyl methacrylate/methyl acrylate copolymer whose monomer unit weight ratio is 70/30 to 40/60 respectively, (2) a methyl methacrylate/ethyl acrylate copolymer whose monomer unit weight ratio is 80/20 to 40/60 respectively, (3) a methyl methacrylate/butyl acrylate copolymer whose monomer unit weight ratio is 85/15 to 65/35 respectively, (4) a methyl methacrylate/2-ethylhexyl acrylate copolymer whose monomer unit weight ratio is 90/10 to 70/30 respectively, (5) a methyl methacryalte/octyl methacrylate copolymer whose monomer unit weight ratio is 85/15 to 65/35 respectively, or (6) a methyl methacrylate/lauryl methacrylate copolymer whose monomer unit weight ratio is 90/10 to 75/25 respectively.

The acrylic lacquer can contain an alkyd resin and a cellulose acetate butyrate resin.

Typical acrylic dispersion lacquers that can be used are disclosed in Fryd and Lee U.S. Pat. No. 3,660,537, issued May 2, 1972. One particularly useful acrylic dispersion lacquer has as the film-forming component a graft copolymer with a backbone which is a copolymer of polymerized (1) monomers of about 85–99.6%, by weight, of an ester of acrylic acid or methacrylic acid;

(2) monomers which provide potential grafting sites of about 0.2–15%, by weight, of allyl methacrylate; and (3) about 0.2–5%, by weight of diethylaminoethyl methacrylate, t-butylaminoethyl methacrylate, aminoethylvinyl ether or dimethylaminoethyl methacrylate;

the total of the monomers which provide potential grafting sites not exceeding 15% by weight of the total backbone, and a polymeric graft segment comprised of polymerized monomers of 2-ethylhexyl acrylate, butylacrylate, 2-ethylhexyl methacrylate or lauryl methacrylate, the graft segment comprising about 5–80% by weight of the total graft copolymer.

One particularly useful graft copolymer used in these dispersion lacquers comprises methyl methacrylate/diethylaminoethyl methacrylate/allyl methacrylate/2-ethylhexyl acrylate in a weight ratio of about 84.00/0.8/0.51/14.2.

An aqueous dispersion lacquer composition of a binder in an aqueous medium can also be used. The binder is comprised of (1) a dispersion polymer of methyl methacrylate that can contain small amounts of adhesion-promoting monomers such as diethylaminomethacrylate, (2) a dispersant polymer of methyl methacrylate, an alkyl acrylate or alkyl methacrylate having 2–12 carbon atoms in the alkyl groups, and an ethylenically-unsaturated carboxylic acid such as acrylic acid or methacrylic acid, and (3) a graft copolymer of the above dispersed polymer and dispersant polymer.

The composition contains sufficient base, e.g., amine or ammonium hydroxide, to provide a pH of about 7–11. Ordinarily, the composition will contain conventional plasticizers, pigments, and such other additives as are used in aqueous coating compositions.

A wide variety of solvent-based thermosetting acrylic enamels, consisting essentially of an acrylic polymer and a crosslinker such as an alkylated melamine formaldehyde, can be used. Typical are those described in Parker U.S. Pat. No. 3,674,734, issued July 4, 1972, Parker U.S. Pat. No. 3,637,546, issued Jan. 25, 1972, and Irven et al. U.S. Pat. No. 3,901,840, issued Aug. 26, 1975.

Of particular use are the acrylic enamels containing cellulose acetate butyrate that are described in the aforementioned Parker '546 patent. The teachings of the Parker patent are hereby incorporated by reference. These enamels comprise about 10–60% by weight of a film-forming polymer blend and a solvent for said polymer blend wherein the polymer blend consists essentially of (1) 50–80% by weight, based on the weight of the polymer blend, of an acrylic polymer which consists essentially of (a) 0–25% by weight of styrene, (b) 25–55% by weight of methyl methacrylate, (c) 38–48% by weight of a soft constituent of an alkyl acrylate or alkyl methacrylate wherein the alkyl groups have 2–12 carbon atoms, (d) 5–20% by weight of a hydroxy-containing constituent of a hydroxyalkyl methacrylate or hydroxyalkyl acrylate wherein the alkyl groups contain 2–4 carbon atoms, and (e) 1–5% by weight of an $\alpha,\beta$-unsaturated monocarboxylic acid;

wherein said acrylic polymer has a relative viscosity of 1.04–1.10 measured at 25° C. in ethylene dichloride according to ASTM D-445-46T, Method B;

(2) 5–50% by weight, based on the weight of the polymer blend, of cellulose acetate butyrate having a butyryl content of about 45–55% by weight and a viscosity of about 1–6 seconds measured at 25° C. according to ASTM D-1343-56;

(3) 5–50% by weight based on the weight of the polymer, of a melamine formaldehyde resin which has been at least partically reacted with an aliphatic monohydric alcohol having from 1–4 carbon atoms.

Particularly useful in these enamels are acrylic polymers of 10–18% by weight of styrene, 25–30% by weight of methyl methacrylate, 38–42% by weight of butryl acrylate, 10–16% by weight of hdyroxyethyl acrylate, and 1–3% by weight of acrylic acid; and acrylic polymers of 40–50% by weight of methyl methacrylate, 40–48% by weight of butyl acrylate, 6–10% by weight of hydroxyethyl acrylate, and 3–5% by weight of acrylic acid.

Aqueous thermosetting acrylic enamels can also be used. These enamels contain the following film-forming constituents:

(1) an acrylic polymer of styrene and/or methyl methacrylate, an alkyl acrylate or an alkyl methacrylate other than methyl methacrylate, a hydroxyalkyl acrylate or a hydroxyalkyl methacrylate and an $\alpha,\beta$-unsaturated carboxylic acid wherein the polymer has an acid number of 35–150 and a carboxyl-to-hydroxyl ratio of 1:0.2 to 1:3, and (2) a water-soluble or water-dispersible alkylated melamine formaldehyde resin. Typical enamels of this type are disclosed in British Patent 1,414,436, granted Feb. 25, 1976.

Preferred are aqueous enamels in which the acrylic polymer contains 50–60% by weight of methyl methacrylate, 30–40% by weight of butyl acrylate, 5–10% by weight of hydroxyethyl acrylate, and 4–12% by weight of acrylic acid, with an acid number of about 35–100 and a carboxyl-to-hydroxyl ratio of 1:0.3 to 1:1.5.

Another preferred aqueous enamel is one in which the acrylic polymer contains 28–32% by weight of styrene, 22–26% by weight of methyl methacrylate, 30–35% by weight of butyl acrylate, 7–9% by weight of hydroxyethyl acrylate, 4–6% by weight of acrylic acid, with an acid number of 30–50, and a carboxyl-to-hydroxyl ratio of 1:0.4 to 1:1.5.

In one particularly preferred aqueous enamel, the acrylic polymer consists essentially of 54% methyl methacrylate, 34% butyl acrylate, 6% 2-hydroxyethyl acrylate, and 6% acrylic acid with an acid number of about 45–50 and a carboxyl-to-hydroxyl ratio of about 1:0.6.

Polyester enamels can also be used. The polyesters are the reaction products of a polyol and a dicarboxylic acid or anhydride, and are crosslinked with a conventional crosslinking agent such as alkylated melamine formaldehyde, benzoguanamine formaldehyde, urea formaldehyde, or the like.

One useful polyester enamel has a binder of a polymer blend of about:

(1) 35–70% by weight, based on the weight of the polymer blend, of a polyester of an alkylene glycol, a triol, an aromatic dicarboxylic acid and an aliphatic dicarboxylic acid;

(2) 15–30% by weight, based on the weight of the polymer blend, of cellulose acetate butyrate; and (3) 15–35% by weight, based on the weight of the polymer blend, of an alkylated melamine formaldehyde resin.

A polyester enamel may be used as a clear coat, but preferably an acrylic enamel or lacquer as described above is used as the clear coat with a polyester enamel color coat dispersion.

A nonaqueous thermosetting acrylic dispersion enamel can be used. These enamels are obtained by polymerizing a hydroxyalkyl acrylate or methacrylate in a dispersing liquid in the presence of a dispersion stabilizer, a carboxylic acid, and an amine. An aminoplast resin is added to the polymer dispersion after an active solvent is added to form a solution of the acrylic polymer. One useful dispersion stabilizer is formed by (1) graft copolymerizing (a) the reaction product of glycidyl methacrylate and poly(12-hydroxystearic acid), (b) methyl methacrylate, and (c) glycidyl methacrylate to form a copolymer product containing pendant epoxy groups; and (2) reacting said pendant epoxy groups with methacrylic acid.

Typically useful nonaqueous thermosetting acrylic dispersion enamels and process for making the same are disclosed in Sullivan et al. U.S. Pat. No. 3,996,667, issued June 29, 1976, hereby incorporated by reference.

Typical acrylic polyurethane coating compositions that can be used are disclosed in Vasta U.S. Pat. No. 3,558,564, issued Jan. 26, 1971.

Plasticizers, pigments and other additives conventionally used in coating compositions can be incorporated into the color coat or clear coat as required. The compositions can be reduced with conventional solvents, if solvent-based compositions, for application such as spraying. If the compositions are aqueous, then water or water/solvent mixtures can be used.

Two particularly useful additives for both the color coat and the clear coat are iron pyrophosphate and finely divided silica. Up to about 10%, and generally about 0.1–10%, by weight, based on the weight of the binder, of iron pyrophosphate can be used. Up to about 15%, and generally about 0.5–15%, by weight, based on the weight of the binder, of finely divided silica can be used. Iron pyrophosphate and silica improve the overall durability and performance of the finish of this invention.

In particular, iron pyrophosphate is useful, because it provides a synergistic effect with the ultraviolet light stabilizer and the antioxidant. Compositions containing all three constituents have a surprisingly longer period of outdoor weatherability before failure occurs. The period exceeds the cumulative effect that would be expected from the combination of the three constituents.

The following example illustrates the invention. All parts and percentages are on a weight basis unless otherwise specified.

EXAMPLE

An acrylic enamel containing cellulose acetate butyrate is prepared according to the teachings of Parker U.S. Pat. No. 3,637,546, issued June 25, 1972.

The following paints are prepared from the acrylic enamel:

| | %, Based on Binder, Ultraviolet Light Stabilizer | %, Based on Binder, Antioxidant |
|---|---|---|
| Paint K | 0 | 0 |
| Paint M | 3.6 | 0 |
| Paint N | 8.3 | 0 |
| Paint O | 3.6 | 0.27 |

The ultraviolet light stabilizer which is used is 2-(2'-hydroxyphenyl)benzotriazole. The antioxidant is tetrakismethylene-3-(3',5'-dibutyl-4'-hydroxyphenyl)propionate methane.

The following clear coats are prepared from the acrylic enamel:

| | %, Based on Binder, Ultraviolet Light Stabilizer | %, Based on Binder, Antioxidant |
|---|---|---|
| Clear Coat K | 0 | 0 |
| Clear Coat L | 6.3 | 0 |
| Clear Coat M | 3.6 | 0 |
| Clear Coat O | 3.6 | 0.27 |

The ultraviolet light stabilizer and antioxidant are the same as those used for the paints.

Paints K, M, N and O are each reduced to a spray viscosity, sprayed onto separate phosphated steel panels, and allowed to dry for 10 minutes.

Clear Coats K, L, M and O are each reduced to a spray viscosity and sprayed to form the following finishes on the panels:

Clear Coat K/Paint K (control)
Clear Coat L/Paint K
Clear Coat M/Paint M
Clear Coat K/Paint N
Clear Coat O/Paint O.

Each panel is allowed to air dry for 10 minutes and then baked for 10 minutes at 82° C. and for 30 minutes at 155° C.

The clear coat on each of the panels is about 1.0 mil thick, and the paint on each of the panels is about 1.0 mil thick.

The panels of Clear Coat L and Paint K in which Clear Coat L contains 6.3% ultraviolet light stabilizer show a discoloration of the clear coat, and the clear coat is softer than the clear coat on the other panels. The discoloration and softness are attributed to the high ultraviolet light stabilizer content of Clear Coat L.

Each of the panels is then exposed to a Q.U.V. "Weather-O-Meter" that uses a SF40 Westinghouse ultraviolet lamp and has the following cycles: 8 hours ultraviolet exposure at 68° C. and 4 hours at 100% relative humidity at 55° C.

The gloss of each of the panels is measured at 20° C. after given exposure times, and checking of the clear coat is noted. The results are as follows:

without ultraviolet stabilizer in the color coat. Comparable weatherability can be obtained by incorporating ultraviolet light stabilizer into the clear coat alone, but only by sacrificing the transparency and hardness of the finish to an extent which is undesirable and impracticable for automobile and truck finishes. Also, as the panel of Clear Coat K over Paint N illustrates, there need not be ultraviolet light stabilizer in the clear coating composition, since the stabilizer will migrate from the color coat to the clear coat in response to weathering.

I claim:

1. A substrate having a finish of a clear coat top layer in firm adherence to a color coat layer in adherence with the substrate; wherein the clear coat contains no ultraviolet light stabilizer and consists essentially of a transparent film-forming binder; and the color coat consists essentially of a film-forming binder and pigment in a pigment-to-binder weight ratio of about 1/100 to 150/100 and initially contains about 1–20% by weight, based on the weight of the binder, of ultraviolet light stabilizer; wherein the ultraviolet light stabilizer migrates from the color coat to the clear coat and continues to do so as ultraviolet light stabilizer is lost from the clear coat due to exposure to weathering, thereby providing an adequate level of ultraviolet light stabilizer to retard deterioration from weathering of the clear coat.

EXPOSURE DATA

| Time Exposure | Gloss Measured At 20° | | | | | | | | | | | | | | | |
|---|---|---|---|---|---|---|---|---|---|---|---|---|---|---|---|---|
| (hrs.) | 0 | 167 | 330 | 659 | 988 | 1153 | 1480 | 1462 | 1855 | 2044 | 2328 | 3011 | 3222 | 3900 | 4500 | 5300 |
| Clear Coat K/ Paint K (control) | 82 | 84 | 89 | 83 | 82 | 75 | 39* | | | | | - FAILED - | | | | |
| Clear Coat L/ Paint K | 81 | 82 | 88 | 88 | 82 | 87 | 84 | 87 | 91 | 88 | 80 | 82 | 84 | 82 | 82* | 58* |
| Clear Coat M/ Paint M | 86 | 86 | 89 | 90 | 93 | 92 | 88 | 94 | 98 | 88 | 87 | 93 | 94 | 93 | 84* | 30* |
| Clear Coat K/ Paint N | 87 | 87 | 88 | 89 | 91 | 91 | 84 | 93 | 95 | 87 | 84 | 93 | 94 | 79* | 46* | — |
| Clear Coat O/ Paint O | 84 | 86 | 87 | 89 | 89 | 91 | 86 | 93 | 94 | 93 | 90 | 96 | 88 | 62* | — | — |

*Checked

The above results show that the control panel, which did not contain ultraviolet light stabilizer or antioxidant, checked at 1480 hours exposure and failed thereafter. The panel having a finish of Clear Coat L, containing a large quantity of ultraviolet light stabilizer, over Paint K, containing no ultraviolet light stabilizer, checked at 4500 hours; however, such a large quantity of stabilizer had been added that the finish was unacceptable for color and softness of the clear coat. The other panels, all of which contained ultraviolet light stabilizer in the color coat, had an acceptable appearance and hardness.

The panel having a finish of Clear Coat M over Paint M, wherein both the clear coat and the color coat contained ultraviolet light stabilizer, checked at 4500 hours. The panel having a finish of Clear Coat K, with no ultraviolet light stabilizer, over Paint N, with a large amount of ultraviolet light stabilizer, checked at 3900 hours and failed after 4500 hours. The panel having a finish of Clear Coat O over Paint O, both containing ultraviolet light stabilizer and antioxidant, checked at 3900 hours and failed at 4500 hours.

From these results, it can be expected that clear coat/color coat finishes in which the color coat contains ultraviolet light stabilizer will have a substantially longer period of outdoor durability than such finishes 2. The substrate of claim 1 wherein the clear coat initially contains about 0.1–5% by weight, based on the weight of the binder, of antioxidant.

3. The substrate of claim 1 wherein the color coat initially contains in addition to the ultraviolet light stabilizer about 0.1–5% by weight, based on the weight of the binder, of antioxidant, wherein the weight ratio of ultraviolet light stabilizer to antioxidant is initially about 1:1 to about 50:1.

4. The substrate of claim 3 wherein the clear coat contains about 0.1–5% by weight, based on the weight of the binder, of antioxidant.

5. A substrate having a finish of a clear coat top layer in firm adherence to a color coat layer in adherence with the substrate; wherein the clear coat consists essentially of a transparent film-forming binder and initially contains about 1–20% by weight, based on the weight of the binder, of ultraviolet light stabilizer; and the color coat consists essentially of a film-forming binder and pigment in a pigment-to-binder weight ratio of about 1/100 to 150/100 and initially contains about 1–20% by weight, based on the weight of the binder, of ultraviolet light stabilizer; wherein the ultraviolet light stabilizer migrates from the color coat to the clear coat and continues to do so as ultraviolet light stabilizer is lost from the clear coat due to exposure to weathering, thereby providing an adequate level of ultraviolet light stabilizer to retard deterioration from weathering of the clear coat; and neither the color coat nor the clear coat contains antioxidant.

6. A substrate having a finish of a clear coat top layer in firm adherence to a color coat layer in adherence with the substrate; wherein the clear coat consists essentially of a transparent film-forming binder and initially contains about 1–20% by weight, based on the weight of the binder, of ultraviolet light stabilizer but contains no antioxidant; and the color coat consists essentially of a film-forming binder and pigment in a pigment-to-binder weight ratio of about 1/100 to 150/100 and initially contains about 1–20% by weight, based on the weight of the binder, of ultraviolet light stabilizer and about 0.1–5% by weight of antioxidant; wherein the ultraviolet light stabilizer migrates from the color coat to the clear coat and continues to do so as ultraviolet light stabilizer is lost from the clear coat due to exposure to weathering, thereby providing an adequate level of ultraviolet light stabilizer to retard deterioration from weathering of the clear coat.

7. A substrate having a finish of a clear coat top layer in firm adherence to a color coat layer in adherence with the substrate; wherein the clear coat consists essentially of a transparent film-forming binder and initially contains about 1–20% by weight, based on the weight of the binder, of ultraviolet light stabilizer and about 0.1–5% by weight of antioxidant; and the color coat consists essentially of a film-forming binder and pigment in a pigment-to-binder weight ratio of about 1/100 to 150/100 and initially contains about 1–20% by weight, based on the weight of the binder, of ultraviolet light stabilizer but contains no antioxidant; wherein the ultraviolet light stabilizer migrates from the color coat to the clear coat and continues to do so as ultraviolet light stabilizer is lost from the clear coat due to exposure to weathering, thereby providing an adequate level of ultraviolet light stabilizer to retard deterioration from weathering of the clear coat.

8. The substrate of claims 1, 2, 3, 4, 5, 6, or 7 wherein the color coat is about 0.4–1.5 mils thick and the clear coat is about 0.5–5.0 mils thick.

9. The substrate of claim 8 wherein the ultraviolet light stabilizer is a benzophenone or a substituted benzotriazole stabilizer.

10. The substrate of claims 2, 3, 4, 6 or 7 wherein the antioxidant is an alkylene(dialkylhydroxyaryl)ester alkane.

11. The substrate of claims 1, 2, 3, 4, 5, 6, or 7 wherein the binder of the clear coat and the color coat is an acrylic polymer or a mixture of acrylic polymers.

12. The substrate of claim 11 wherein the binder of the clear coat and the color coat consists essentially of (A) at least one of
- (1) poly(methyl methacrylate),
- (2) poly(ethyl methacrylate),
- (3) poly(propyl methacrylate),
- (4) poly(isopropyl methacrylate),
- (5) a copolymer consisting of methyl methacrylate and at least one of an alkyl acrylate whose alkyl group contains 1 through 20 carbon atoms, an alkyl methacrylate whose alkyl group contains 2 through 18 carbon atoms, or styrene,
- (6) mixtures of these; and (B) at least one of
- (1) a copolymer consisting of methyl methacrylate and an alkyl acrylate whose alkyl group contains 1 through 10 carbon atoms or an alkyl methacrylate whose alkyl group contains 4 through 18 carbon atoms, or
- (2) mixtures of said copolymers.

13. The substrate of claim 11 wherein the binder of the clear coat and the color coat consists essentially of (A) poly(methyl methacrylate); and (B) at least one of
- (1) a methyl methacrylate/methyl acrylate copolymer whose monomer unit weight ratio is 70/30 to 40/60 respectively,
- (2) a methyl methacrylate/ethyl acrylate copolymer whose monomer unit weight ratio is 80/20 to 40/60 respectively,
- (3) a methyl methacrylate/butyl acrylate copolymer whose monomer unit weight ratio is 85/15 to 65/35 respectively,
- (4) a methyl methacrylate/2-ethylhexyl acrylate copolymer whose monomer unit weight ratio is 90/10 to 70/30 respectively,
- (5) a methyl methacrylate/octyl methacrylate copolymer whose monomer unit weight ratio is 85/15 to 65/35 respectively, or
- (6) a methyl methacrylate/lauryl methacrylate copolymer whose monomer unit weight ratio is 90/10 to 75/25 respectively.

14. The substrate of claim 13 wherein the binder contains in addition to the acrylic polymer an alkyd resin and cellulose acetate butyrate.

15. The substrate of claim 14 wherein the ultraviolet light stabilizer is hydroxydodecyloxybenzophenone.

16. The substrate of claims 2, 3, 4, 6, or 7 wherein the binder of the clear coat and the color coat consists essentially of (A) poly(methyl methacrylate); and (B) at least one of
- (1) a methyl methacrylate/methyl acrylate copolymer whose monomer unit weight ratio is 70/30 to 40/60 respectively,
- (2) a methyl methacrylate/ethyl acrylate copolymer whose monomer unit weight ratio is 80/20 to 40/60 respectively,
- (3) a methyl methacrylate/butyl acrylate copolymer whose monomer unit weight ratio is 85/15 to 65/35 respectively,
- (4) a methyl methacrylate/2-ethylhexyl acrylate copolymer whose monomer unit weight ratio is 90/10 to 70/30 respectively,
- (5) a methyl methacrylate/octyl methacrylate copolymer whose monomer unit weight ratio is 85/15 to 65/35 respectively, or
- (6) a methyl methacrylate/lauryl methacrylate copolymer whose monomer unit weight ratio is 90/10 to 75/25 respectively.

17. The substrate of claim 15 wherein the binder contains in addition to the acrylic polymer an alkyd resin and cellulose acetate butyrate.

18. The substrate of claim 17 wherein the ultraviolet light stabilizer is hydroxydodecyloxybenzophenone.

19. The substrate of claim 18 wherein the antioxidant is tetrakismethylene-3-(3',5'-dibutyl-4-'-hydroxyphenyl)propionate methane.

20. The substrate of claim 11 wherein the acrylic polymer is a graft copolymer consisting essentially of a backbone copolymer of polymerized (A) monomers of about 85–99.6% by weight, based on the weight of the backbone, of an alkyl ester of acrylic acid or methacrylic acid, (B) monomers which provide potential grafting sites of about 0.2–15% by weight, based on the weight of the backbone, of allyl methacrylate, and (C) about 0.2–5% by weight, based on the weight of the backbone, of diethylaminoethyl methacrylate, t-butylaminoethyl methacrylate, aminoethylvinyl ether or dimethylaminoethyl methacrylate, the total of the monomers which provide potential grafting sites not exceeding 15% by weight of the total backbone; and a polymeric graft segment comprised of polymerized monomers of 2-ethylhexyl acrylate, butylacrylate, 2-ethylhexyl methacrylate or lauryl methacrylate, the graft segment comprising about 5–80% by weight of the total graft copolymer.

21. The substrate of claim 20 wherein the acrylic polymer consists essentially of a backbone of polymerized monomers of methyl methacrylate, diethylaminoethyl methacrylate, allyl methacrylate, and a graft segment of polymerized monomers of 2-ethylhexyl acrylate or butyl acrylate.

22. The substrate of claim 21 wherein the ultraviolet light stabilizer is hydroxydodecyloxybenzophenone.

23. The substrate of claims 2, 3, 4, 6, or 7 wherein the acrylic polymer is a graft copolymer consisting essentially of a backbone copolymer of polymerized (A) monomers of about 85–99.6% by weight, based on the weight of the backbone, of an alkyl ester of acrylic acid or methacrylic acid, (B) monomers which provide potential grafting sites of about 0.2–15% by weight, based on the weight of the backbone, of allyl methacrylate, and (C) about 0.2–5% by weight, based on the weight of the backbone, of diethylaminoethyl methacrylate, t-butylaminoethyl methacrylate, aminoethylvinyl ether or dimethylaminoethyl methacrylate, the total of the monomers which provide potential grafting sites not exceeding 15% by weight of the total backbone; and a polymeric graft segment comprised of polymerized monomers of 2-ethylhexyl acrylate, butylacrylate, 2-ethylhexyl methacrylate or lauryl methacrylate, the graft segment comprising about 5–80% by weight of the total graft copolymer.

24. The substrate of claim 23 wherein the acrylic polymer consists essentially of a backbone of polymerized monomers of methyl methacrylate, diethylaminoethyl methacrylate, allyl methacrylate, and a graft segment of polymerized monomers of 2-ethylhexyl acrylate or butyl acrylate.

25. The substrate of claim 24 wherein the ultraviolet light stabilizer is hydroxydodecyloxybenzophenone.

26. The substrate of claim 25 wherein the antioxidant is tetrakismethylene-3-(3',5'-dibutyl-4'-hydroxyphenyl)-propionate methane.

27. The substrate of claim 11 wherein the binder of the clear coat and the color coat consists essentially of a polymer blend of (A) a polymer of methyl methacrylate, and (B) a polymer of methyl methacrylate, an alkyl acrylate or an alkyl methacrylate having 2–12 carbon atoms in alkyl groups, and an ethylenically unsaturated carboxylic acid, and (C) a graft copolymer of (1) and (2) above.

28. The substrate of claims 1, 2, 3, 4, 5, 6, or 7 wherein the binder of the clear coat and the color coat is an acrylic polymer cross-linked with an alkylated melamine formaldehyde resin.

29. The substrate of claim 28 wherein the binder of the clear coat and the color coat contains cellulose acetate butyrate.

30. The substrate of claim 29 wherein the binder of the clear coat and the color coat consists essentially of (A) 50–80% by weight, based on the weight of the binder, of an acrylic polymer which consists essentially of (1) 0–25% by weight of styrene, (2) 25–55% by weight of methyl methacrylate, (3) 38–48% by weight of a soft constituent selected from the group consisting of an alkyl acrylate and an alkyl methacrylate wherein the alkyl groups contain 2–12 carbon atoms, (4) 5–20% by weight of a hydroxy-containing constituent selected from the group consisting of a hydroxyalkyl methacrylate and a hydroxyalkyl acrylate wherein the alkyl groups contain 2–4 carbon atoms, and (5) 1–5% by weight of an $\alpha,\beta$-unsaturated monocarboxylic acid, wherein said acrylic polymer has a relative viscosity of 1.04–1.10 measured at 25° C. in ethylene dichloride according to ASTM D-445-46T, Method B;

(B) 5–50% by weight, based on the weight of the binder, of cellulose acetate butyrate having a butyryl content of about 45–55% by weight and a viscosity at 25° C. of about 1–6 seconds measured according to ASTM D-1343-56; and (C) 5–50% by weight, based on the weight of the binder, of a melamine formaldehyde resin which has been at least partially reacted with an aliphatic monohydric alcohol having from 1–4 carbon atoms.

31. The substrate of claim 30 wherein the acrylic polymer consists essentially of 10–18% by weight of styrene, 25–30% by weight of methyl methacrylate, 38–42% by weight of butyl acrylate, 10–16% by weight of hydroxyethyl acrylate and 1–3% by weight of acrylic acid.

32. The substrate of claim 30 wherein the acrylic polymer consists essentially of 40–50% by weight of methyl methacrylate, 40–48% by weight of butyl acrylate, 6–10% by weight of hydroxyethyl acrylate and 3–5% by weight of acrylic acid.

33. The substrate of claim 30 wherein the ultraviolet light stabilizer is a 2(2'-hydroxyphenyl)benzotriazole and the antioxidant is tetrakismethylene-3-(3',5'-dibutyl-4'-hydroxyphenyl)propionate methane.

34. The substrate of claim 11 containing up to 10% by weight, based on the weight of the binder, of iron pyrophosphate.

35. The substrate of claim 11 containing up to 15% by weight, based on the weight of the binder, of finely-divided silica.

36. The substrate of claim 11 containing about 0.1–10% by weight, based on the weight of the binder, of iron pyrophosphate and about 0.5–15% by weight, based on the weight of the binder, of finely-divided silica.

37. The substrate of claim 11 wherein the binder of the color coat and the clear coat consists essentially of (A) an acrylic polymer of methyl methacrylate, an alkyl acrylate or an alkyl methacrylate other than methyl methacrylate, a hydroxyalkyl acrylate or a hydroxyalkyl methacrylate, and an $\alpha,\beta$-unsaturated carboxylic acid wherein the polymer has an acid number of 35–150 and a carboxyl-to-hydroxyl ratio of 1:0.2 to 1:3, and (B) a crosslinker of alkylated melamine formaldehyde resin.

38. The substrate of claim 37 wherein the acrylic polymer consists essentially of 50–60% by weight of methyl methacrylate, 30–40% by weight of butyl acrylate, 5–10% by weight of hydroxyethyl acrylate and 4–12% by weight of acrylic acid, and the polymer has an acid number of about 35–100 and a carboxyl-to-hydroxyl ratio of 1:0.3 to 1:1.5.

39. The substrate of claim 37 wherein the acrylic polymer consists essentially of 28–32% by weight of styrene, 22–26% by weight of methyl methacrylate, 30–35% by weight of butyl acrylate, 7–9% by weight of hydroxyethyl acrylate, 4–6% by weight of acrylic acid, and has an acid number of 30–50, and a carboxyl-to-hydroxyl ratio of 1:0.4 to 1:1.5.

40. The substrate of claim 37 wherein the acrylic polymer consists essentially of 54% by weight of methyl methacrylate, 34% by weight of butyl acrylate, 6% by weight of 2-hydroxyethyl acrylate, and 6% by weight of acrylic acid, and has an acid number of about 45–50 and a carboxyl-to-hydroxyl ratio of about 1:0.6.

41. The substrate of claim 37 wherein the ultraviolet light stabilizer is 2-hydroxy-4-methoxy-2′-carboxybenzophenone or hydroxyphenylbenzotriazole.

42. The substrate of claim 11 wherein the binder of the color coat consists essentially of a polymer formed by polymerizing a hydroxyalkyl acrylate or methacrylate in the presence of a dispersion stabilizer.

43. The substrate of claim 42 wherein the dispersion stabilizer is formed by (A) polymerizing (1) the reaction product of glycidyl methacrylate and poly(12-hydroxystearic acid), (2) methyl methacrylate, and (3) glycidyl methacrylate, to form a copolymer product containing pendant epoxy groups; and (B) reacting said pendant epoxy groups with methacrylic acid.

44. The substrate of claim 43 wherein the ultraviolet light stabilizer is a substituted 2(2′-hydroxyphenyl)benzotriazole and the antioxidant is tetrakismethylene-3-(3′,5′-dibutyl-4′-hydroxyphenyl)propionate methane.

45. The substrate of claims 1, 2, 3, 4, 5, 6, or 7 wherein the binder of the color coat is a blend of a polyester, which is the reaction production of a polyol and a dicarboxylic acid, and a cross-linking agent, and the binder of the clear coat is an acrylic polymer.

46. The substrate of claim 45 wherein the binder of the color coat is a blend consisting essentially of (A) 35–70% by weight, based on the weight of the blend, of a polyester of alkylene glycol/triol/aromatic dicarboxylic acid/aliphatic dicarboxylic acid, (B) 15–30% by weight, based on the weight of the polymer blend, of cellulose acetate butyrate, and (C) 15–35% by weight, based on the weight of the polymer blend, of an alkylated melamine formaldehyde resin, and the binder of the clear coat is an acrylic resin.

47. The substrate of claim 46 wherein the ultraviolet light stabilizer is a substituted 2-(2′-hydroxyphenyl)benzotriazole.

48. A process for finishing a substrate which comprises (A) applying a color coat layer to the substrate wherein the color coat consists essentially of a liquid carrier and a film-forming binder and pigments in a pigment-to-binder weight ratio of about 1/100 to about 150/100 and initially contains about 1–20% by weight, based on the weight of the binder, of ultraviolet light stabilizer;

(B) applying a clear coat layer directly to the color coat layer wherein the clear coat contains no ultraviolet light stabilizer and consists essentially of a liquid carrier and a film-forming binder; and (C) drying the above applied layers to form a finish on the substrate.

49. The process of claim 48 wherein the clear coat contains about 0.1–5% by weight, based on the weight of the binder, of antioxidant.

50. The process of claim 48 wherein the color coat contains in addition to the ultraviolet light stabilizer about 0.1–5% by weight, based on the weight of the binder, of antioxidant, wherein the weight ratio of ultraviolet light stabilizer to antioxidant is initially about 1:1 to about 50:1.

51. The process of claim 50 wherein the clear coat contains about 0.1–5% by weight, based on the weight of the binder, of antioxidant.

52. A process for finishing a substrate which comprises:

(A) applying a color coat layer to the substrate wherein the color coat consists essentially of a liquid carrier and a film-forming binder and pigments in a pigment-to-binder weight ratio of about 1/100 to about 150/100 and initially contains about 1–20% by weight, based on the weight of the binder, of ultraviolet light stabilizer;

(B) applying a clear coat layer directly to the color coat layer wherein the clear coat consists essentially of a liquid carrier and a film-forming binder and initially contains about 1–20% by weight, based on the weight of the binder, of ultraviolet light stabilizer; and (C) drying the above applied layers to form a finish on the substrate; wherein neither the color coat layer nor the clear coat layer contains an antioxidant.

53. A process for finishing a substrate which comprises:

(A) applying a color coat layer to the substrate wherein the color coat consists essentially of a liquid carrier and a film-forming binder and pigments in a pigment-to-binder weight ratio of about 1/100 to about 150/100 and initially contains about 1–20% by weight, based on the weight of the binder, of ultraviolet light stabilizer and about 0.1–5% by weight of antioxidant;

(B) applying a clear coat layer directly to the color coat layer wherein the clear coat consists essentially of a liquid carrier and a film-forming binder and initially contains about 1–20% by weight, based on the weight of the binder, of ultraviolet light stabilizer but contains no antioxidant; and (C) drying the above applied layers to form a finish on the substrate.

54. A process for finishing a substrate which comprises:

(A) applying a color coat layer to the substrate wherein the color coat consists essentially of a liquid carrier and a film-forming binder and pigments in a pigment-to-binder weight ratio of about 1/100 to about 150/100 and initially contains 1-20% by weight, based on the weight of the binder, of ultraviolet light stabilizer but contains no antioxidant;

(B) applying a clear coat layer directly to the color coat layer wherein the clear coat consists essentially of a liquid carrier and a film-forming binder and initially contains about 1-20% by weight, based on the weight of the binder, of ultraviolet light stabilizer and about 0.1-5% by weight of antioxidant; and (C) drying the above applied layers to form a finish on the substrate.

55. The process of claims 48, 49, 50, 51, 52, 53, or 54 wherein the resulting color coat is about 0.4-1.5 mils thick and the clear coat is about 0.5-5.0 mils thick.

56. The process of claim 55 wherein the color coat and clear coat are formed from an acrylic lacquer with a binder consisting essentially of (A) at least one of
  (1) poly(methyl methacrylate),
  (2) poly(ethyl methacrylate),
  (3) poly(propyl methacrylate),
  (4) poly(isopropyl methacrylate),
  (5) a copolymer composed only of methyl methacrylate and at least one of an alkyl acrylate whose alkyl group contains 1 through 20 carbon atoms, an alkyl methacrylate whose alkyl group contains 2 through 18 carbon atoms, or styrene,
  (6) mixtures of these; and
(B) at least one of
  (1) a copolymer composed only of methyl methacrylate and an alkyl acrylate whose alkyl group contains 1 through 10 carbon atoms or an alkyl methacrylate whose alkyl group contains 4 through 18 carbon atoms, or
  (2) mixtures of said copolymers; and
(C) an inert organic solvent for (A) and (B).

57. The process of claim 55 wherein the color coat and the clear coat are formed from solvent-based acrylic dispersion lacquers with a binder consisting essentially of a graft copolymer having (A) a backbone which is a copolymer comprised of polymerized
  (1) monomers of about 85-99.6% by weight of an alkyl ester of acrylic acid or methacrylic acid,
  (2) monomers which provide potential grafting sites of about 0.2-15% by weight of allyl methacrylate, and
  (3) monomers of about 0.2-5% by weight of diethylaminoethyl methacrylate, t-butylaminoethyl methacrylate, aminoethylvinyl ether, or dimethylaminoethyl methacrylate, the total of the monomers which provide potential grafting sites not exceeding 15% by weight of the total backbone; and
(B) a polymeric graft segment comprised of polymerized monomers of 2-ethylhexyl acrylate, butylacrylate, 2-ethylhexyl methacrylate or lauryl methacrylate, the graft segment comprising from 5-80% by weight of the total graft copolymer.

58. The process of claim 57 wherein the graft copolymer has a backbone which is a copolymer comprised of polymerized monomers of methyl methacrylate, allyl methacrylate and diethylaminoethyl methacrylate, and draft segments which are a copolymer comprised of polymerized monomers of 2-ethylhexyl acrylate or butyl acrylate.

59. The process of claim 55 wherein the color coat and the clear coat are formed from aqueous acrylic dispersions with a binder consisting essentially of (A) a dispersed polymer A of methyl methacrylate and small amounts of an adhesion-promoting monomer, and
(B) a dispersant polymer B of methyl methacrylate, an alkyl acrylate or an alkyl methacrylate, and an ethylenically unsaturated carboxylic acid,
(C) a graft copolymer of the dispersed polymer A and dispersant polymer B; and the lacquer contains sufficient base to provide a pH of about 7-11.

60. The process of claim 55 wherein the color coat and clear coat are formed from aqueous acrylic dispersions with a binder consisting essentially of (A) an acrylic polymer of methyl methacrylate, an alkyl acrylate or an alkyl methacrylate other than methyl methacrylate, a hydroxyalkyl acrylate or a hydroxyalkyl methacrylate, and an $\alpha,\beta$-unsaturated carboxylic acid wherein the polymer has an acid number of 35-150 and a carboxyl-to-hydroxyl ratio of 1:0.2 to 1:3, and
(B) a water-soluble or water-dispersible alkylated melamine formaldehyde resin; and the lacquer contains sufficient base to provide a pH of about 7-11.

61. The process of claim 55 wherein the color coat and the clear coat are formed from a thermosetting nonaqueous dispersion of a polymer formed by polymerizing a hydroxyalkyl acrylate or methacrylate in a liquid in the presence of a dispersion stabilizer.

62. The process of claim 61 wherein the dispersion stabilizer is formed by (A) polymerizing
  (1) the reaction product of glycidyl methacrylate and poly(12-hydroxystearic acid),
  (2) methyl methacrylate, and
  (3) glycidyl methacrylate, to form a copolymer product containing pendant epoxy groups; and
(B) reacting said pendant epoxy groups with methacrylic acid.

63. The process of claim 55 wherein the color coat and clear coat are formed from a thermosetting acrylic enamel comprising 10-60% by weight of a film-forming binder and a solvent for said binder, wherein said binder consists essentially of (1) 50-80% by weight, based on the weight of the binder, of an acrylic polymer consisting essentially of
  (a) 0-25% by weight of styrene,
  (b) 25-55% by weight of methyl methacrylate,
  (c) 38-48% by weight of a soft constituent selected from the group consisting of an alkyl acrylate and an alkyl methacrylate wherein the alkyl groups contain 2-12 carbon atoms,
  (d) 5-20% by weight of a hydroxy-containing constituent selected from the group consisting of a hydroxyalkyl methacrylate and a hydroxyalkyl acrylate wherein the alkyl group contains 2-4 carbon atoms, and (e) 1–5% by weight of an $\alpha,\beta$-unsaturated monocarboxylic acid, wherein said acrylic polymer has a relative viscosity of 1.04–1.10 measured at 25° C. in ethylene dichloride according to ASTM D-445-46T, Method B;

(2) 5–50% by weight, based on the weight of the binder, of cellulose acetate butyrate having a butyryl content of about 45–55% by weight and a viscosity at 25° C. of about 1–6 seconds measured according to ASTM-D-1343-56; and (3) 5–50% by weight, based on the weight of the binder, of a melamine formaldehyde resin which has been at least partially reacted with an aliphatic monohydric alcohol having from 1–4 carbon atoms.

64. The process of claim 55 wherein the enamel contains about 0.1–10% by weight, based on the weight of the binder, of iron pyrophosphate and 0.5–15% by weight, based on the weight of the binder, of finely-divided silica.

65. The process of claim 55 wherein the color coat is formed from a composition comprising about 10–50% by weight, of a blend of a polyester, which is the reaction product of a polyol and a dicarboxylic acid, and a cross-linking agent, and the clear coat is an acrylic lacquer.

66. The substrate of claims 1, 2, 3, 4, 5, 6, or 7 wherein the substrate is metal.

67. The substrate of claims 1, 2, 3, 4, 5, 6, or 7 wherein the substrate is a ferrous metal.

68. The substrate of claims 1, 2, 3, 4, 5, 6, or 7 wherein the substrate is a flexible material.

69. The substrate of claim 68 wherein the substrate is a flexible plastic.

70. The substrate of claim 68 wherein the substrate is a flexible hydrocarbon rubber.

71. The substrate of claim 68 wherein the flexible material is a polyurethane.

* * * * *